United States Patent [19]

Ludwig et al.

[11] 4,017,419
[45] Apr. 12, 1977

[54] CATIONIC BITUMINOUS EMULSIONS

[75] Inventors: Charles H. Ludwig, Bellingham; Larry B. Fiske, Everson, both of Wash.

[73] Assignee: Georgia-Pacific Corporation, Portland, Oreg.

[22] Filed: Jan. 2, 1976

[21] Appl. No.: 646,372

[52] U.S. Cl. .......................... 252/311.5; 106/277; 260/124 A; 260/124 R
[51] Int. Cl.² .......................................... B01J 13/00
[58] Field of Search ............... 252/311.5; 106/277; 260/124 A, 124 R

[56] References Cited

UNITED STATES PATENTS

| | | | |
|---|---|---|---|
| 3,126,350 | 3/1964 | Borgfeldt | 252/311.5 |
| 3,359,738 | 12/1967 | Dybalski et al. | 106/277 X |
| 3,697,497 | 10/1972 | Falkehag | 260/124 A |
| 3,867,162 | 2/1975 | Elste | 252/311.5 |
| 3,871,893 | 3/1975 | Doughty | 252/311.5 |

*Primary Examiner*—Benjamin R. Padgett
*Assistant Examiner*—E. Suzanne Parr
*Attorney, Agent, or Firm*—Peter P. Chevis

[57] ABSTRACT

A cationic bitumen emulsion stabilized with a polyamine-lignin reaction product is described.

16 Claims, No Drawings

CATIONIC BITUMINOUS EMULSIONS

This invention pertains to a cationic bitumen or asphalt emulsion. More particularly, it pertains to stabilizing cationic bitumen emulsions, in presence of aggregate, to retard the set and to obtain more complete and uniform coating of the aggregate.

Bitumen or asphalt is widely used for many applications with paving and surface coating possibly being the most extensive. While asphalt may be applied by different methods, there has been an increasing shift to emulsions, both cationic and anionic, to replace cutbacks and hot asphalt in many applications. Cationic emulsions are obtained by dispersing fine asphalt particles in a continuous water phase by use of cationic emulsifiers. The emulsion particles carry a positive charge and readily deposit or coat the aggregate which is generally negatively charged. The rate of asphalt deposition may be varied somewhat by the emulsifier and emulsion formulation used but is relatively rapid compared to anionic emulsions which depend more upon evaporation of water for their deposition. In unstabilized emulsions, the deposition of asphalt may take place immediately upon contact with the aggregate which usually results in the asphalt being deposited upon the aggregate in large droplets without the aggregate being completely or uniformly coated. Stabilizers are often added to the emulsions to control the set to permit substantially uniform and complete coating of the aggregate with a continuous asphalt film.

The use of spent sulfite liquor or lignosulfonate as an anionic asphalt emulsifier, as well as the use of ammonium lignosulfonate have been disclosed in U.S. Pat. Nos. 2,332,542 and 2,494,708. Calcium lignosulfonate in U.S. Pat. No. 2,978,342 has been suggested as an anti-stripping agent for use in hot asphalt applications to enhance the coating and bonding of the hot asphalt to wet aggregate such that it will not readily be displaced or stripped from the aggregate upon being subjected to water. However, in cationic asphalt emulsions, spent sulfite liquor or lignosulfonate is not sufficiently compatible or effective as a stabilizer to be used to any extent. The reaction of alkali lignins with primary and secondary amines and formaldehyde in the Mannich-type reaction has been disclosed for the preparation of a cationic asphalt emulsifier in U.S. Pat. No. 3,126,350 as well as disclosure made in U.S. Pat. No. 3,718,639 that lignin base asphalt emulsion additives may be obtained by reacting alkali lignin with a tertiary amine-epichlorohydrin intermediate condensation product. The latter processes involve costly processing and a stabilizer which could be prepared more simply from lignin is greatly desired.

It is therefore an object of this invention to provide a cationic bitumen emulsion stabilized with a stabilizer prepared from a lignin. Another object is to provide a cationic asphalt emulsion employing a stabilizer which may be readily prepared from a lignosulfonate. A still further object is to provide an effective lignin based stabilizer for cationic asphalt emulsions.

The above and other objects of the invention are attained using as a stabilizer a product prepared by reacting a lignin under alkaline conditions at a pH above 10 with from 8 to 35 percent of a water-soluble polyamine at temperatures of at least 100° C until a sufficient portion of the polyamine has been combined with the lignin to have the reacted lignin be soluble in aqueous solutions of the cationic emulsifier under acid conditions, for example, pH 2.5 or so. Generally, lignins are not compatible with the water-soluble cationic emulsifiers usually used in preparation of asphalt or bitumen emulsions. While lignosulfonate may be water soluble, it forms insoluble salts with the emulsifiers under the acid conditions and concentrations used. Other lignins are generally insoluble under the acid conditions. In addition to the modification of the lipophilic and hydrophilic properties upon reaction of the lignin with the polyamine and base, the reaction product obtained has diminished anionic character and is generally cationic as indicated by the streaming current determination and is effective in stabilizing asphalt emulsions which are dispersed with commonly used aliphatic amine salts or quaternary ammonium salts.

Lignins are polymeric substances composed of substituted aromatics found in plant and vegetable tissue associated with cellulose and other plant constituents. In the pulp and paper industry, lignin-containing materials such as wood, straw, corn stalks, bagasse, and other vegetable and plant tissues are processed to recover the cellulose or pulp. The residual pulping liquors containing the lignin as by-products are thus one of the main sources of lignins. While there is some variation in the chemical structure of lignin, depending upon the plant from which lignin is obtained, place where the plant is grown, and also upon the method used in recovery or isolation of the lignin from the plant tissue, the basic structure and properties of the lignins are similar. Thus, lignin obtained by any method or from any source may be used in this reaction as long as the lignin is in a form soluble in an aqueous alkaline medium.

Since the lignins separated from the plant may be chemically altered somewhat from that found in the plant, the term "lignins," as used herein, means the lignin products which are obtained upon separation from the cellulose or recovered from the plant. In the sulfite pulping process, the lignocellulosic material is digested with a bi-sulfite or sulfite resulting in the sulfonation of the lignins. In other methods of the recovery or separation of the lignins from the plant, the lignins may not be sulfonated but may be chemically altered somewhat in some other manner. For example, in residual pulping liquors obtained in the sulfate and other alkaline pulping processes, the lignins are present as alkaline metal salts dissolved in the alkaline aqueous liquor. "Hydrolysis lignin" obtained from the hydrolysis of lignocellulosic materials in manufacture of sugar is likewise altered somewhat from that found in the plant and when insoluble under alkaline conditions has to be further modified before it can be used.

The residual pulping liquors, or the lignin-containing product obtained in the separation or recovery of lignins from the plant, will generally contain lignins of various molecular weights. These liquors also may contain other constituents besides the lignins. For example, in the sulfite pulping process, the spent sulfite liquor contains lignosulfonates which may be present as salts of cations, such as ammonium, calcium, magnesium, sodium and other cations which may have been present during the sulfonation of the lignin. The spent sulfite liquor generally contains only about 45 to 65 weight percent on oven-dried basis of lignosulfonates with the remainder being carbohydrates and other organic and inorganic constituents dissolved in the liquor. Lignin products obtained by other pulping processes may likewise contain other materials such as carbohydrates, degradation products of carbohydrates, and resinous materials which are separated from the lignocellulosic materials with the lignin. Lignin obtained by hydrolysis of lignocellulosic materials may not contain the carbohydrates but may contain resinous type materials as well as other materials which are not removed by the hydrolysis. It is not necessary to separate the lignin-containing constituents from the other constituents. The lignin product as obtained containing all of the constituents may be used as such or after being subjected to different treatments such as fractionation, alkaline, acid, or heat treatments as well as reacted with chemicals to modify or remove some of the lignin and/or non-lignin constituents prior to the reaction with the polyamine. The removal of inorganic constituents, which may be more easily carried out before reaction with polyamines, may be desirable when the inorganic salt concentration is high such as in kraft liquors.

The polyamines reacted with the lignin are the water soluble, organic, polyamines having a molecular weight of from about 60 to 300 and containing from about 20 to 47 weight percent of organically bound amino-type nitrogen with not more than one nitrogen atom being attached to a particular carbon atom which carbon atom is free of other functional substituents, i.e., no other atoms are attached to the carbon except hydrogen and/or carbon in addition to the amino-type nitrogen. At least one of the amine groups must be a primary or a secondary amine group. Illustrative examples of the more readily available polyamines which may be used are the straight-chained, branch-chained, and cyclic primary and secondary polyamines such as polyalkylenimines as ethylenediamine, diethylenetriamine, triethylenetetramine, tetraethylenepentamine, pentaethylenehexamine, "Polyamine HPA No. 2", and others as, 1,2- or 1,3-propanediamine, 1,4-butanediamine, 1,5-pentanediamine, 1,3,5-pentanetriamine, N,N-bis-(3-aminopropyl)methylamine, N,N-bis-(2-aminoetyl)ethylenediamine and N-(2-aminoethyl)piperazine. The primary and secondary polyamines are preferred with the lower molecular weight polyamines having a molecular weight up to about 220 such as, for example, polyalkylenimines as ethylenediamine, diethylenetriamine, triethylenetetramine, and others being most often used.

Polyamines containing tertiary amine and quaternary ammonium groups or where some of the primary and secondary nitrogen functions may have substituents added replacing a hydrogen by various reactions may also be used as long as at least one, preferably more than one, of the nitrogens is present in the form of a primary or secondary amine group and the substituents on the nitrogen groups are not present in numbers or in chain lengths such as to make the polyamine water-insoluble under alkaline conditions. Polyamines containing heterocyclic substituents incorporating the nitrogen function such as those found in piperidine, and morpholine are likewise operative. Illustrative examples of these types of polyamines are N,N-dimethyl-1,3-propanediamine, N,N-diethyl-1,3,propanediamine, N-(2-aminoethyl)morpholine, and 3-aminopropyltrimethyl ammonium chloride. Amines containing hydroxyl groups may also be used. However, the products may be ineffective for emulsifiers containing hydroxyl and/or ether linkages such as the alkoxylated emulsifiers.

In the reaction of the amine with the lignin, the amine may be simply added to an alkaline lignin solution and heated at a temperature of at least 100° C for a sufficient time to react the polyamine with the lignin to obtain the desired lipophilic and hydrophilic properties such that the product would form soluble aqueous solutions with the emulsifier under acid conditions. Generally, from 8 to 35% of amine is added, based upon the spent liquor or lignin solids, and the mixture heated for up to 65 hours or longer. Preferably 12 to 20% of amine is used and the mixture is heated at a temperature of from 130° to 150° C for from 2 to 8 hours. At higher temperatures less time is required. For example, just heating the mixture to 230° C or so may be sufficient. Long contact times at high temperatures should be avoided since lignin may undergo degradation reactions at high temperatures under the highly alkaline reaction conditions. The product after reaction generally contains from about 3 to 8 percent by weight of nitrogen.

By reaction of the amine with a lignosulfonate, the sulfonate radical is sufficiently masked, eliminated, or modified to minimize or eliminate the strongly anionic character of the radical. However, in the reaction of the lignosulfonates with amines or polyamines, or with formaldehyde and amine as in the Mannich reaction, or in a reaction which may involve the hydroxyl groups of the lignin, a portion of the amine may be present in the protonated form to form salts at low pH with the sulfonate groups present in the lignosulfonate macromolecule. This salt formation decreases to a certain extent the cationic properties of the molecule and also results in the precipitation or decreased water solubility of the product under acid conditions. The reaction of the lignosulfonate with the polyamines under alkaline conditions to the extent that a substantial portion of the lignosulfonate becomes reacted with the amine and alkali, minimizes the anionic nature of the sulfonate groups which in turn increases the solubility and allows cationic characteristics to be evident in the products when they are subjected to streaming current determinations and used as stabilizers at low pH. Probably, more than one reaction takes place. A mixture of the amine with an alkaline lignosulfonate solution is anionic even at low pH. However, upon heating the mixture for a short time with sufficient amine and alkali, a product having cationic properties at low pH is obtained. Further heating may not appreciably increase the cationic strength of the product as measured by its streaming current, but the alcohol solubility of the lignosulfonate in the reaction product increases indicating a modification of the lipophilic and hydrophilic properties. Generally, upon intermixing the lignosulfonate with the amine and alkali, only a small amount of the lignosulfonate as measured by ultraviolet adsorption is extracted or dissolved in an ethanol water solution containing about 80% ethanol. However, upon heating the reaction mixture to obtain the desired extent of reaction, generally at least 25% and usually 40% or more of the lignin in the reaction mixture is converted to a product which is soluble in 80% alcohol. With alkali lignin, generally an appreciable proportion of unreacted lignin is alcohol soluble and the reaction of the lignin with the amine will not greatly affect the alcohol solubility of the product, but the water solubility of the reacted lignin under acid conditions is increased. Generally, alkali lignin is only soluble in an aqueous medium on the alkaline side such as pH 8 and above. Since the amines used in the reaction with the lignin are water-soluble or hydrophilic, their reaction with alkali lignin and other insoluble lignins will impart sufficient hydrophilic properties to the product to have the product form aqueous solutions with the emulsifier under acid conditions and concentrations generally used.

Generally, relatively concentrated aqueous solutions are used for carrying out the reaction of the polyamine with the lignin. Lignin solutions containing from 30 to 50% solids are preferred with a practical concentration being in the range of about 10 to 50% solids. While concentrations above 50% may be used, the viscosity of the reaction mixture may increase making it less convenient to obtain good mixing of the reactants at least at the beginning of the reaction. Apparently, after the polyamine and lignosulfonate have been reacted sufficiently to alter the anionic characteristics of the lignin, mixing and further contact in solution is not necessary, since the product after the initial reaction may be dried and heated in a dry state to obtain the desired alcohol solubility. Likewise, solutions less than 10% may be used, but no advantage is obtained by using dilute solutions and from a practical point of view would mainly be used when the reaction is carried out simultaneously with the evaporation of the reaction mixture. The reaction is effected under alkaline conditions at a pH of 10 or above. Any alkali metal oxide, or hydroxide and mixtures with alkaline earth metal oxide or hydroxide or lower molecular weight quaternary ammonium hydroxide may be used to obtain the alkalinity desired.

After reaction of the amine with the lignin, the product is usually added or intermixed with the emulsifier prior to the acidification and the formation of the aqueous solution or mixture used in the emulsion preparation. The amount of the stabilizer used, based upon the solids content, may be widely varied from about 10% to 100% of the amount of emulsifier used in the emulsification of the asphalt. Generally, an amount of from 50 to 100% of the emulsifier is used which may represent from 0.1 to 1.5 weight percent of the total asphalt emulsion.

While generally the stabilizer is effective with most of the water-soluble, cationic aliphatic amine salt and quaternary ammonium salt emulsifiers used for forming asphalt or other bitumen emulsions in water, the effectiveness may vary with the particular emulsifier and stabilizer used. For example, for some slow set emulsifiers, a stabilizer may not improve the coating characteristics but may be effective in having the emulsion pass the ASTM D244 cement mixing test, while for other slow set emulsifiers the stabilizer may be effective in improving both the coating characteristics and the cement test results. The conditions and reactants employed in the preparation of the stabilizer affect somewhat the solubility and other properties of the product. The stabilizer must be substantially compatible with the emulsifier in the water at the concentration generally used for emulsion preparation to stabilize the set by lowering somewhat or otherwise modifying the cationic strength of the emulsion or emulsifier. The water-soluble polyamine compounds commonly used as emulsifiers are aliphatic diamines, quaternary ammonium compounds, and the alkoxylated products thereof obtained, for example, by reaction of the diamines and quaternary ammonium compounds with ethylene oxide. The cationic emulsifiers generally contain at least one aliphatic hydrocarbon group or substituent of from 8 to 22 carbons with aliphatic hydrocarbon chains of from 12 to 18 carbons being most common. A number of the cationic emulsifiers are listed in U.S. Pat. Nos. 3,359,738 and 3,236,671. These cationic emulsifiers are the salts of N-alkyl polymethylene diamines; N-alkyl polymethylene mono- and polyalkoxylated diamines; heterocyclic amines such as alkyl-N-aminoethylimidazolines and alkyl-N-aminoethylpiperazines, glyoxalidines and oxazolines; alkyl and alkyl polyalkoxylated quaternary ammonium salts; and alkyl and alkyl polyalkoxylated diquaternary ammonium salts. The long chain alkyl substituent of the emulsifiers is commonly derived from fatty acids and mixtures thereof such as are found, for example, in tallow, coconut oil, and soybean oil.

The following examples further illustrate the invention:

EXAMPLE 1

A fermented calcium-base spent sulfite liquor was base-exchanged with sodium sulfate to obtain a sodium-base spent sulfite liquor by precipitation of the calcium as calcium sulfate. After removal of the calcium sulfate, a series of runs was made where 15 parts by weight of diethylenetriamine and 30 parts of 50% sodium hydroxide aqueous solution were added to a 40 % sodium base spent sulfite liquor solution containing 100 parts by weight of solids. The samples were heated for different periods of time at a temperature of 145°–150° C. The resultant products were cooled and a sample of each extracted with 80% ethanol to determine the amount of lignin which was soluble in the alcohol. In determining the alcohol solubility, a sample of the reaction product was taken containing 0.2 gram of solids and diluted to 5 milliliters with water. The 5-milliliter sample was then gradually added with mixing to 25 milliliters of 95% ethanol. After standing for one hour, the ethanol mixture was filtered and the absorbance at 232.5 nanometers of the filtrate was measured. The percent of ethanol soluble ultraviolet absorbing material in the filtrate, considered as the alcohol soluble lignin, was then determined by comparison with the absorbance found for the sample before extraction. The time of reaction and the percent of lignosulfonate extracted by ethanol is shown in the table below:

| Time of Heating (minutes) | % Lignosulfonate Extracted |
|---|---|
| 0 | 5.25 |
| 46 | 27.0 |
| 66 | 40.7 |
| 106 | 42.0 |
| 160 | 45.0 |

The products which had been reacted for 46 and 160 minutes were tested as a stabilizer in a cationic medium-set asphalt emulsion. The emulsifier used was an alkyl quaternary ammonium chloride sold commercially as a water-soluble medium-set emulsifier. The stabilizer was added to the emulsifier in an amount of about 80% of the emulsifier which mixture was then diluted with water and acidified to pH 5.0 – 5.5 and used in preparation of an asphalt emulsion. The emulsifier was added in an amount such that the final emulsion, containing about 56 percent asphalt, contained about 0.5% of the emulsifier and 0.4% of the stabilizer. A coating test was used to determine the improvement in the set by noting the uniformity of covering obtained when the asphalt emulsion was applied to a silica or sand mixture. The sand mixture was obtained by mixing 70 grams of Ottawa sand all passing through a 50-mesh screen with 30 grams silica flour passing through a 200-mesh screen. To the mixed sand and silica flour, 10 grams of distilled water were added and mixed with a spatula until a uniform moistened mixture was obtained. To this mixture asphalt emulsion containing 5 grams of asphalt was added and the mixture stirred for one minute with a spatula. The material was then formed into a patty and after setting was viewed to determine the coating or coverage obtained by noting the variation of color and shading due to the relative amounts of coated and uncoated portions of the silica. The samples were rated from 1 to 10 on a scale such that an unstabilized cationic medium-set emulsion would have a value of about 2, and a cationic slow-set emulsion would have a value of about 5. Under the above rating, the coverage for the emulsions stabilized by the products which were heated for 46 and 160 minutes were rated 3.5 and 4.5 respectively. The coverage obtained with an emulsion containing about 0.8% of the final emulsion of the aforementioned medium-set emulsifier to which no stabilizer was added had the assigned value of 2.

The product obtained upon heating the polyamine with the lignosulfonate for 160 minutes was also used as a stabilizer for a slow-set cationic emulsion emulsified with a polyoxyethylated-N-alkyl diaminopropane sold by Armak under the name of Ethoduomeen T/20. In the coating test, the emulsion without the stabilizer had a coating rating of 5 and upon the addition of the stabilizer, the coating rating obtained was 6.

Also the above product was used as a stabilizer in a slow-set cationic asphalt emulsion emulsified with a polyalkoxylated alkyl diamine emulsifier likewise commercially sold for use in asphalt emulsions. The emulsifier and stabilizer were used at about pH 5.5 in amounts representing 0.70% and 0.48%, respectively, of the final emulsion. The coverage rating obtained was about 6.5.

EXAMPLE II

An unfermented calcium-base spent sulfite liquor was converted to the sodium base and reacted with ethylene diamine in a manner similar to that described above. Two preparations were made. In one preparation, fifteen parts of ethylenediamine per 100 parts of the sodium base spent sulfite liquor solids were added while in the second preparation 10 parts of ethylenediamine were used. The lignosulfonate with the amine and caustic were heated at about 150° C for 4⅓ hours. The stabilizer obtained in each case was used with the medium-set cationic emulsifier described in Example I. The stabilizer was added to the emulsifier to obtain an equal ratio mixture and added to the emulsion such that the final emulsion contained about 0.4% each of the emulsifier and the stabilizer. A coating test was performed using a naturally occurring sand having about the same characteristics as that described above. The coating obtained with the sample emulsion which was modified with the product prepared with 15 parts of the ethylenediamine was rated 5 while that stabilized with the product made with 10 parts of diamine was rated as 4.

EXAMPLE III

A low molecular weight fraction of a fermented calcium base spent sulfite liquor obtained by gel filtration was reacted with triethylenetetramine. The stabilizer was prepared by adding 25 parts of triethylenetetramine and 32 parts by weight of 50% caustic solution to a 51% solution of the low molecular weight lignosulfonate fraction containing 100 parts by weight of solids. The mixture was reacted at 75° C for 17 hours, dried, and then heated at a temperature of 150° C for an additional 16 hours. The product obtained was used as a stabilizer for an emulsion prepared using a N-alkyl-1,3-diaminopropane emulsifier. The stabilizer was added to the emulsifier in a proportion such that one part of stabilizer on a solids basis was present for about two parts of the emulsifier. The asphalt emulsion was prepared by addition of the emulsifier with the stabilizer in an amount such that the emulsifier represented about 0.33 weight percent of the final emulsion and the stabilizer 0.16 weight percent. A coating test made using Ottowa Shell 90 sand gave a value of 5. Without the stabilizer, the coating rating was estimated at less than 1, the coating being very uneven.

EXAMPLE IV

A stabilizer was prepared from a vanillin raffinate. In preparation of vanillin, a fermented calcium base liquor is subjected to an alkaline oxidation process whereby the lignin is subjected to considerable cleavage so that the mother liquor remaining after removal of the vanillin contains a somewhat modified low-molecular weight lignosulfonate. Triethylenetetramine in amount of 25 parts by weight was added to a 23% aqueous solution of the vanillin raffinate containing 100 parts by weight of solids. The alkaline raffinate was at pH 13.3 so that no alkali was added. The mixture was heated at 150° C for about 2¾ hours. The stabilizer thus obtained was used in the stabilization of a cationic medium-set emulsion emulsified with the alkyl quaternary ammonium chloride emulsifier described in Example I. The emulsifier and the stabilizer used in the emulsion represented about 0.4% each of the final asphalt emulsion. The coverage obtained using a naturally occurring sand having about the same characteristics as the mixture of Ottawa sand and silica flour had a rating of 4.

EXAMPLE V

An alkali lignin obtained by precipitation of lignin from the black liquor of a kraft pulping process was used in preparation of the stabilizer. One hundred parts of dried kraft lignin with 30 parts of 50% caustic solution were added to 400 milliliters of water to which 14 parts by weight of ethylene diamine were added. The mixture was reacted at 150° C for 3½ hours. The reaction product was then tested as a stabilizer for the medium-set emulsifier described in Example I. The emulsifier and stabilizer were added to the asphalt emulsion in amounts representing about 0.4% each of the total asphalt emulsion. The coverage obtained for a naturally occurring sand rated 6.5.

What is claimed is:

1. In a cationic bitumen emulsion wherein from 30 to about 75% by weight of bitumen is dispersed in an aqueous continuous phase using a cationic, water-soluble aliphatic amine salt or quaternary ammonium salt emulsifier, the improvement which comprises a lignin-polyamine reaction product being present in a sufficient amount to stabilize the set time of the emulsion in presence of negatively charged aggregate, said lignin-polyamine reaction product being a lignin heated under alkaline conditions at a pH of at least 10, with from 8 to 35 percent by weight of a water-soluble, aliphatic polyamine at a temperature of at least 100° C until sufficient amount of amine has reacted with the lignin for the reaction product to form aqueous solutions with the emulsifier under acid conditions, said lignin being soluble in an aqueous alkaline medium said polyamine containing at least one primary or secondary amine group and said polyamine having a molecular weight of from about 60 to 300 and containing from 20 to 47 percent organically bound amino-type nitrogen with only one amino-type nitrogen atom being attached to a particular carbon atom and said amino-type nitrogen being the only functional substituent on said carbon atom.

2. A composition according to claim 1 wherein the polyamine heated with lignin is a primary or secondary polyamine.

3. A composition according to claim 2 wherein the lignin is a lignosulfonate.

4. A composition according to claim 3 wherein the lignosulfonate is heated with the amine until at least 25% of the lignin is converted to a product soluble in 80% ethanol at a pH above 10.

5. A composition according to claim 4 wherein the polyamine is a polyalkylenimine having a molecular weight in the range of 60 to 220.

6. A composition of claim 5 wherein the polyamine is heated with the lignosulfonate in an amount of from about 12 to 20 weight percent of the lignosulfonate.

7. A composition according to claim 2 wherein the lignin is a kraft lignin heated with the polyamine in an amount of from about 12 to 20 weight percent.

8. A composition according to claim 7 wherein the emulsifier is selected from the group consisting essentially of N-alkyl polymethylene diamine and polyalkoxylated derivatives thereof and N-alkyl quaternary ammonium chloride and polyalkoxylated derivatives thereof, said alkyl substituent having from 8 to 22 carbon atoms.

9. A composition according to claim 8 wherein the emulsifier is N-alkyl-1,3-propane diamine, said alkyl radical having from 12 to 18 carbon atoms.

10. A composition according to claim 9 wherein the lignin is a lignosulfonate heated with from 12 to 20% of a primary or a secondary polyamine having a molecular weight in the range of 60 to 220 until at least 25 percent of the lignosulfonate is converted to a product soluble in 80% ethanol at a pH above 10.

11. In a process for the preparation of a cationic bitumen emulsion wherein from 30 to about 75 weight percent of bitumen is dispersed in an aqueous continuous phase using a cationic, water-soluble aliphatic amine salt or quaternary ammonium salt emulsifier, the improvement which comprises adding to the emulsifier a lignin-polyamine reaction product in a sufficient amount to stabilize the set time of the emulsion in presence of negatively charged aggregate, said lignin-polyamine reaction product being a lignin heated under alkaline conditions at a pH of at least 10 with from 8 to 35 percent by weight of a water-soluble, aliphatic polyamine at a temperature of at least 100° C for a reaction time up to 65 hours until a major portion of the polyamine has reacted with the lignin, said lignin being soluble in an aqueous alkaline medium said polyamine containing at least one primary or secondary group, and said polyamine having a molecular weight of from about 60 to 300 and containing from 20 to 47% organically bound nitrogen with not more than one amino-nitrogen being attached to a carbon atom and said amino-nitrogen being the only functional substituent on said carbon atom.

12. A process according to claim 11 wherein the lignin and polyamine are reacted at a temperature of 130° to 150° C for from 2 to 8 hours.

13. A process according to claim 12 wherein the lignin is heated with 12 to 20 percent of the polyamine.

14. A process according to claim 13 wherein the polyamine is a polyalkylenimine having a molecular weight in the range of 60 to 220.

15. A process according to claim 13 wherein the emulsifier is selected from the group consisting essentially of N-alkyl polymethylene diamine and polyalkoxylated derivatives thereof and N-alkyl quaternary ammonium chloride and polyalkoxylated derivatives thereof, said alkyl substituent having from 8 to 22 carbon atoms.

16. A process according to claim 13 wherein the lignin is a lignosulfonate which is reacted with the polyalkyleneimine until at least 25% of the lignin is converted to a product soluble in 80% ethanol.

* * * * *